Jan. 15, 1935.  W. A. MYERS  1,987,630
SEPARATION OF LIQUIDS FROM VAPORS OR GASES
Filed Sept. 1, 1932

Inventor
William A. Myers
By T. Wallace Quinn
His Attorney

Patented Jan. 15, 1935

1,987,630

UNITED STATES PATENT OFFICE 1,987,630

SEPARATION OF LIQUIDS FROM VAPORS OR GASES

William A. Myers, Springfield, Pa., assignor to The Atlantic Refining Company, Philadelphia, Pa., a corporation of Pennsylvania Application September 1, 1932, Serial No. 631,311

8 Claims. (Cl. 183—12)

This invention relates to the separation of liquids from vapors, especially to the separation of entrained or atomized liquid from vapor or gas. Special application for the invention occurs in the case of absorption of gases in liquid, in the evaporation of solutions containing a normally solid material as solute, in mist extraction, and more particularly, in the separation of entrained mist from vapors in connection with a fractionating operation, such, for example, as the separation of entrained mist from vapor in the fractionation of petroleum. The invention will be illustrated primarily in connection with de-entrainment of liquid droplets from vapor in the course of fractionation of a composite fluid, having particularly in mind the fractionation of petroleum oil or components thereof.

The present invention resides in apparatus of the character hereinafter described and claimed.

In the operation of fractionating means, such as ordinary fractionating columns used in petroleum refining, what is sought is maximum throughput for means of a given size, and at the same time a sharp separation of the composite liquid into component fractions. When the heated vapors to be fractionated are fed to the column at a high velocity, the velocity of the vapors through the column tends to carry liquid from one plate or contacting zone to another, in the form of fine mist of entrained liquid droplets. When the vapors introduced into the column are heated in a pipe still or similar heating means, the vapors contain in suspension a very fine, persistent liquid entrainment. This liquid entrainment is so persistent that usually it is carried through several plates, or series of louvers, or other contacting means, up the column, thereby resulting in contamination of the lower side streams withdrawn, which often constitute the lubricating fractions, the color of which is a property of particular importance.

Efforts have been made in the past to provide apparatus to minimize both of the above effects, namely, to prevent liquid from being carried from one plate or zone to the next in the vapors and to prevent the persistent entrainment of vapors coming from a pipe still from being carried up the column. Such endeavors have resulted in placing metal plates or baffles in the column above the liquid level of one or more plates, the plates usually being set at an angle to the general direction of flow of the vapors up the column. Baffles have also been arranged so that each successive tier of baffles reversed the direction of deflection of the vapors. Various other means, of which the above are illustrative, have been attempted in the endeavor to solve this problem, which is of particularly great significance to the petroleum refiner, the refiner of coal tar oil, and in general to those who are engaged in the large scale fractionation of liquids or in processes which necessitate the separation of mist from vapors or gases.

If we consider fractionation as carried out in the bubble plate fractionating column, such as is shown in the accompanying drawing, which is a common type of column employed in fractionation of petroleum, we can readily visualize that when vapors are passing up the column at a rate of, for example, 1½ to 2½ feet per second as is common practice in systems operated under atmospheric pressure, or much higher, in the case of vacuum column operation, that there will be a strong tendency for the liquid to be lifted off each plate, atomized, and carried with the vapors onto the plate or plates above. In fact, in the general operation of such fractionating columns, the space between the liquid level on any plate and the next plate above is filled with a mixture of vapors and atomized liquid particles. While this mist-vapor mixture provides an intimate contact to bring about fractionation, it is essential to the efficiency of the fractionation that heavy, high boiling liquid particles be not carried onto the next plate. It is also desirable that the effective cross sectional, up-flow area of the column be not substantially reduced in the endeavor to keep heavy liquid from being carried up the column. It is also desirable that the means which are employed for keeping the heavy liquid particles from being carried up to the next plate be of such nature that, on continued use of the column, they will not accumulate material which will tend to choke up the passage through the column for vapors.

In weighing the merits of any scheme of fractionation, it is important to look at the principal factors which limit the velocity which may suitably be employed in any fractionating column. These principal factors can be briefly summed up as follows:

1. The cross sectional area of the down-flow pipes. The downflow pipes must be of sufficient cross section to carry the flow of liquid from one plate to the plate next below under the pressure conditions which obtain. The point where the most significant restriction to the flow of liquid down the down-flow pipes exists is at the top of the pipe where the liquid enters. This restriction is incurred due to the weir effect which is encountered or brought about by the liquid stream entering the pipe. Accordingly, liquid down-flow pipes are customarily made with their tops of greater diameter than their bottoms, to lessen or mitigate this difficulty.

2. The velocity of the vapors through the column cannot exceed that velocity which produces a pressure drop between one plate and another which, when expressed as the height of a column of liquid reflux, is equal to the length of the seal in the downflow pipe. The pressure tending to drive the liquid down the downflow pipe is equal to the pressure on the higher plate, plus the pressure of the liquid seal in the downflow pipe, less the pressure on the lower plate, the pressure on the lower plate always being greater than on the plate next above it. As the velocity of the vapors through a column are increased, the pressure differential between one plate and the plate next above is correspondingly increased with the result that the pressure differential tending to drive the liquid down the downflow pipe is correspondingly decreased.

3. The velocity cannot exceed that velocity at which an appreciable amount of liquid will be carried from one plate to the plate next above, for, when an appreciable amount of liquid is being carried from one plate to the plate next above, the very object of the apparatus is defeated, namely, that of fractionation.

My invention, as related to fractionation, deals primarily with the factors set out under captions 2 and 3, and particularly with the factor discussed under the latter caption, namely a method and means for removing or at least substantially reducing liquid entrainment which tends to be carried by the vapors from one plate to the next plate. In providing for this accomplishment, my invention takes into account the importance of not materially reducing or restricting the cross-sectional area for passage of the vapors up the column. My invention provides for the usage of one or a plurality of mats or mattresses of filamentous material so arranged in the vapor or gas stream that the vapors need not, and do not pass through such mats, at least to any appreciable extent or degree. My invention further provides means of preventing the liquid particles, removed by the filamentous mats of material, from being swept back into the vapor stream. It obviates means whereby a high resistance is built up to the flow of vapors. Even if, in the course of long usage of a fractionating column equipped according to the present invention, for separation of liquids from vapors, the filamentous mat or mats of material become gummed up to an appreciable extent with a deposit of resinous or tarry or coky materials or other solids, still the cross-sectional area of the path of up-flow of the gas would not thereby be materially restricted.

The provisions and scope of my invention are illustrated by reference to the accompanying drawing in which.

In the accompanying drawing, like numerals refer to similar parts in the several figures.

Figure 1:
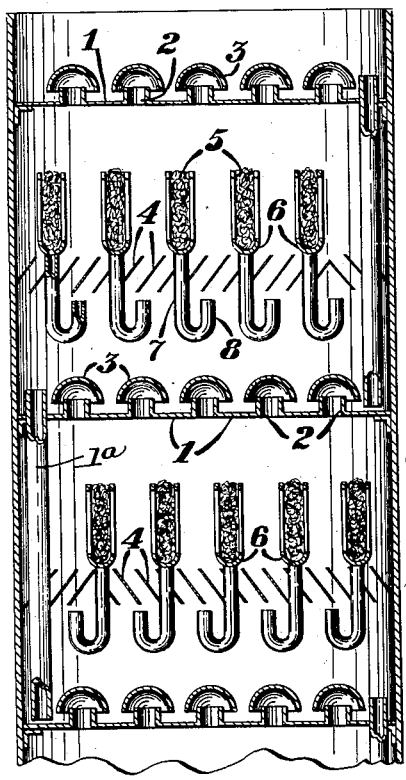
Fig. 1 is a section of a bubble plate fractionating column containing my means for removal of entrained liquids from vapors.
Figure 2:
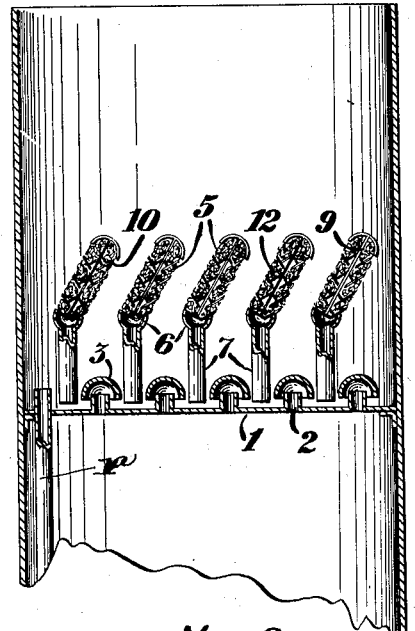
Fig. 2 shows a modification of the liquid removing means which eliminates the necessity of plate deflecting members as disclosed in the apparatus of Fig. 1.

In Fig. 1, 1 represents each of the several plates of the fractionating column. Each plate is provided with a down pipe 1ª and vapor uptakes 2, having bubble caps 3. The vapors, in passing from one plate to the plate next above, rise through the uptakes 2, are deflected downwardly by bubble caps 3, and are distributed into the liquid upon the plate by means of serrated lower peripheral edges on the bubble caps (not shown). The vapors are thus introduced into the liquid in the form of small spherical bodies of gas which rise as bubbles through the liquid on the plate. These bubbles mechanically carry some of the liquid off the plate, thereby creating a spray of liquid distributed in the vapors above the liquid level on the plate. In my apparatus, this vapor-liquid composite or mist, which exists above the liquid level on the plate, in its rapid passage upward, is deflected at an angle by means of deflecting members 4. The composite of vapor and liquid is deflected at such an angle that all portions of the vapor stream are directed against filamentous mats or mattresses of material 5, which, preferably are composed of steel wool or material of similar character, with a high percentage of void space, as for example, void space of the order of upwards of 90%. Because of the high pressure in the steel wool which develops as soon as vapors are passed through the column, the vapors themselves do not to substantial extent penetrate the steel wool because there is no impelling force to carry them thereinto; the pressure within the steel wool mat, which is equally as high as the surrounding pressure, to substantial extent prevents the vapors or gases from passing into or through the steel wool. However, the liquid particles because of their high density and correspondingly relatively high kinetic energy, are carried into the steel wool mass where the particles are retained, and, as an agglomerated liquid, drain down into the troughs 6, each of which has a central downtake pipe 7. Each downtake pipe may have its lower end 8 curved upwardly so that the uprising vapors will not blow up the down-take pipe. Instead of this scheme of disposing of the agglomerated liquid, if desired, the end of the downflow pipe may be, as shown in Fig. 2, introduced below the liquid level on the plate below. By this arrangement, the liquid is entirely removed from the path of the rapidly uprising vapor so that its being swept into the vapor stream again, as occurs in ordinary baffling systems, is avoided.

The steel wool mats 5 should have a dimension from their respective troughs 6 to the respective topmost points of the mats as great as the design of the column will permit, because the higher the mat of steel wool the farther the mats can be spaced apart, and therefore, the less the effective area for passage of the vapors will be reduced. For any given angular setting and height, of the plate deflecting members 4 and a given height of filamentous mats, the mats should be sufficiently close together so that a portion of a mat will be in the line of vapors directed by any baffle; or, putting it another way, depending on the height and spacing of the filamentous mats, the baffle members should be set at such an angle and should be of such a height that the vapors will be made to impinge against a mat. That is, as can be readily seen, if the mats were very short and the baffles had only a slight angularity to the vertical, much of the vapors containing liquid entrainment would not be even directed toward a surface of a filamentous mat, and hence it could not be expected that the liquid would be removed thereby; all of the uprising vapors should be deflected by the baffles toward the filamentous or penetrable surface of a mat, i. e., the tops of one baffle should overlap the bottom of an adjacent baffle so that every portion of the stream of uprising vapors will be deflected. On the other hand, if a column were being initially designed for the installation of my liquid separating apparatus, the limiting factor for the height of the steel wool mats would be an economy balance of conservation of effective area of uptake passage of vapors against the corresponding increase of column height necessitated by such conservation of cross sectional area.

Fig. 2 shows a different arrangement of apparatus for effecting the separation of liquids from vapors in a bubble plate column according to the same theory of operation as underlies the arrangement of apparatus of Fig. 1. Instead of having baffle members 4, as explained in the arrangement shown in Fig. 1, the steel wool mats 5 are themselves placed at an angle to the general direction of the path of flow of the vapors. Usually, the mats are placed at an angle of about 30° to the vertical and are long enough so that the topmost edge of one steel wool mat overlaps the bottom of the adjacent steel wool mat so that every portion of the upward flowing vapor stream will be deflected by a steel wool mat. The angularity of the steel wool mats to the vertical may be varied depending upon the column to which they are to be adapted. For example, if there is not much space between the plates in the column, it may be necessary to have the angularity of the steel wool mats as great or greater than 45° to the vertical.

As in the apparatus shown in Fig. 1, the coalesced liquid is drained from each mat 5 into its respective trough 6 and from there is conducted through respective downflow pipe 7, which is shown dipped below the liquid level of the zone to which the liquid is being conducted. This method of discharging the coalesced liquid into the zone is shown as a variation which may be employed in place of the method of discharge shown in Fig. 1, which latter method provides upturned ends 8 on the downtake pipes 7. Within the steel wool mats 5 there is located a central solid or perforated plate 9 and plates 10, to facilitate the passage of coalesced liquid into the trough 6, and thereby out of contact with uprising vapors. The plates 10, which normally extend from end to end of the steel wool mat, may be supported in position at two or more points, for example, by rods 12, as shown, which are fastened to the central plate 9.

Figure 3:
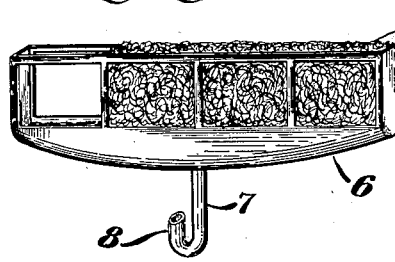
Fig. 3 is a side view of one of the liquid removing elements shown in Fig. 1.

Fig. 3 shows a side view of one of the liquid separating elements of Fig. 1. As in Fig. 1, 5 is a steel wool mat below which is a trough 6 from which collected liquid is drained into a centrally located downflow pipe 7.

Figure 4:
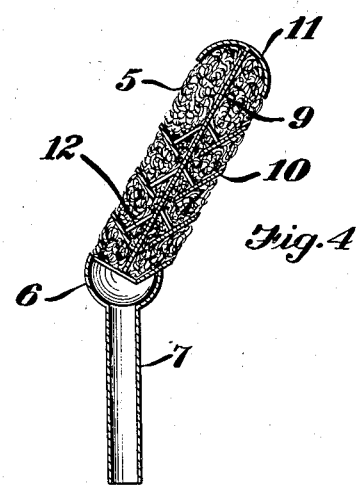
Fig. 4 is an enlarged detailed view of one of the liquid separating elements of Fig. 2.

Fig. 4 is an enlarged view of a cross-section of a preferred construction of one of the filamentous mats shown in Fig. 2. As in Fig. 2, 6 is the trough in which liquid is collected and 7 is the downflow pipe which is preferably located centrally in the trough. The steel wool mat 5 is provided with a solid or perforated central plate 9 and a plurality of plates 10 arranged at an angle as shown. The plates 10 may be fastened at either end to suitable frame-work of the steel wool mattress and/or fastened at a plurality of points by tie-rods to the central plate, or they may be simply held at such angle by packing steel wool therearound, the steel wool itself being held together between the element 6 at the bottom and the solid plate 11 at the top by suitable frame-work such as is shown in Fig. 3. These angular plates 10 are for the purpose of preventing vapors or gas from blowing through the outer edge of the filamentous mat but are principally for the purpose of inducing the coalesced liquid to drain into the trough 6 and not again be swept into the gas stream. In the absence of these members 10 there would be some tendency for the liquid collected to drain to the outside of the steel wool and again be picked up by the rapidly moving vapors. In lieu of the plates 10, rods or other means may be employed to guide coalesced liquid into a trough 6.

Figure 5:
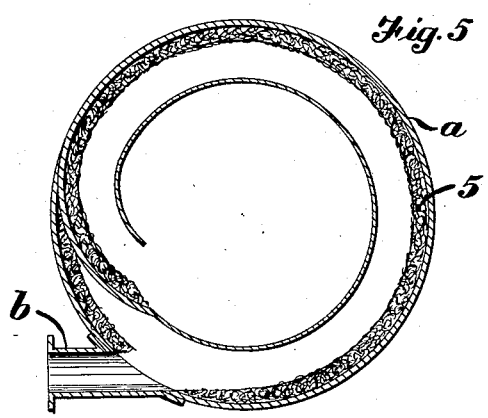
Fig. 5 shows another adaptation of my invention which is particularly suitable for the removal of the persistent type of liquid entrainment contained in vapors coming from a pipe still, preliminary to the passage of the vapors through a fractionating column, for example.

Fig. 5 shows another means of applying a filamentous material in such a way that the vapors or gas from which an entrained liquid is to be removed will not have to pass through, and will not pass through the separating means, i. e., the filamentous mass of material, to substantial extent. Fig. 5 may be taken to represent a section in a fractionating column at which a vapor containing entrained liquid is introduced from a heating means, particularly from a pipe still. The steel wool 5 is placed in a layer around and within the circumference $a$ of the column. The liquid containing vapors are introduced tangentially into the column through pipe $b$, and, due to the centrifugal force created by the circular or helical path of the vapors, the dense particles of entrained liquid of high kinetic energy are driven into the steel wool and collected, and are removed therefrom by any suitable means. The vapors, however, due to their relatively low density and due to the fact that their pressure is not higher than that within the steel wool, do not pass through the steel wool layer to any substantial extent.

In general, the arrangement of liquid separating means shown in Fig. 1 is the preferred method of arrangement, but where distance between plates is short, it may often be necessary or preferable to use the arrangement shown in Fig. 2, or some other modification of my invention which will be evident from the general disclosure and illustrations contained herein. While not shown in Fig. 1, central solid (or perforated) plates, such as those shown in the mats of Fig. 2, may be employed in the mats in Fig. 1. Such modification will often be of advantage where very high vapor velocities are used, for example.

As is discernible from the above, my invention improves the efficiency of a fractionating column; that is, it makes possible cleaner fractionation for a given number of plates, or, what amounts to the same thing, it makes possible a better and closer fractionation for a given number of plates. When employing my invention, the rate of throughput for a given column can be substantially greater without appreciable impairment of fractionation.

The fact that in my liquid separating means, liquid which is being removed from the stream of gas or vapor is immediately carried out of the current of uprising vapors, and rapidly down the column out of contact with the uprising stream of gas or vapor and the further fact that the vapors pass around and not through the mats of material, which accomplishments are not attained in the ordinary arrangement of baffling or liquid separating means, provides a reason why the filamentous or equivalent material in my arrangement maintains freedom from deposits and gums for a long period of time, if not indefinitely.

While the apparatus of my invention has been illustrated in connection with a fractionating tower of the bubble plate type, it is suited to other uses, for example, use in a column having series of louvers or panel plates as the contacting means for each contacting zone, and such other uses as come within the scope of the appended claims.

What I claim is:

1. Apparatus for removing entrained liquid from a moving stream of gas which comprises a passage for the gas, a filamentous mat of material situated in said passage, directing baffles situated in said passage, said baffles and filamentous mat being so arranged with relation to each other and to the direction of flow of the gas that the onwardly moving gases are directed by the baffles against a surface of said filamentous mat, and means associated with said filamentous mat adapted to conduct liquid from the mat, out of contact with gas passing therearound.

2. Apparatus for removing entrained liquid from a moving stream of gas which comprises a passage for the gas, a filamentous mat of material so situated in said passage that gas in passing therethrough will impinge thereagainst, but situated so that the gas may pass therearound, a trough for collecting liquid, located beneath said mat and associated therewith, means within said mat for directing liquid therefrom into said trough, and means for conducting liquid from said trough downwardly and out of contact with vapors passing around said mat.

3. Apparatus for removing entrained liquid from a moving stream of gas which comprises a passage for the gas, a filamentous mat of material so arranged in the passage that the gas in its onward movement therethrough is made to impinge against said mat, but so arranged that the gas may pass therearound, a trough located beneath said mat and associated therewith so as to collect liquid which drains from said mat, a plurality of plates within said mat arranged in a declining position from the exterior to the interior of said mat to conduct liquid to the center thereof, and a pipe for leading liquid from said trough downwardly and out of contact with gases passing upwardly.

4. In fractionating apparatus, which comprises a conduit, inlets and outlets in said conduit, a plurality of partitions within said conduit which form therein a series of chambers, means in said partitions whereby gas is permitted to flow in one direction therethrough, and additional means in said partitions so that liquid may flow in the opposite direction therethrough, said last mentioned means being so adjusted as to maintain a liquid level in each of the chambers; that improvement which comprises a plurality of filamentous mats arranged within at least one of said chambers in spaced relation one to the other, and above the normal liquid level in the chamber, said mats being arranged with surfaces approximately parallel to the axis of the conduit, directing baffles located within said chamber above said normal liquid level, said baffles and mats being so arranged with relation to each other, and to the general direction of flow of the gas stream through the conduit that the baffles will cause onward moving gas to impinge against the surfaces of said mats.

5. In fractionating apparatus which comprises a substantially vertically arranged conduit, inlets and outlets in said conduit, a plurality of partitions within said conduit, one above another, which form therein a series of chambers, means in said partitions whereby gas may flow upwardly therethrough, and additional means in said partitions so that liquid may flow downwardly therethrough, said last mentioned means being so adjusted as to maintain a liquid level on each of said partitions in the conduit; that improvement which comprises a plurality of filamentous mats arranged within at least one of said chambers in spaced relation one to the other, adjacent the upper portion of the chamber and above the normal liquid level therein, said mats being arranged with surfaces approximately parallel to the axis of the conduit, directing baffles located within said chamber above the liquid level therein, said baffles and mats being so arranged with relation to each other, and to the general direction of flow of the gas stream that the baffles cause onward moving gas to impinge against the surfaces of said filamentous mats, troughs located beneath said mats and associated therewith, means within said mats for directing the flow of liquid therefrom into said troughs, and an outlet pipe leading from each of said troughs and discharging below the normal level of liquid on the partition therebelow.

6. In a fractionating apparatus which comprises a conduit, inlets and outlets in said conduit, a plurality of inter-communicating chambers within said conduit whereby gas is permitted to flow in one direction and liquid may flow in the opposite direction therethrough; that improvement which comprises a filamentous mat of material situated in said conduit, baffles situated in said conduit, said baffles and filamentous mat being so arranged with relation to each other and to the direction of flow of the gas that the onwardly moving gas is directed by the baffles against a surface of said filamentous mat, and so that the gas may pass around said filamentous mat in its progress through the conduit.

7. In a fractionating apparatus which comprises a conduit, inlets and outlets in said conduit, a plurality of intercommunicating chambers within said conduit, whereby gas is permitted to flow in one direction and liquid may flow in the opposite direction therethrough; that improvement which comprises a filamentous mass of material so arranged in said conduit that gas in passing therethrough is made to impinge against a surface of said filamentous mass and may pass around said filamentous mass, and means associated with said filamentous mass of material whereby liquid may be conducted therefrom, out of contact with gases passing therearound.

8. Apparatus for removing entrained liquid from a moving stream of gas, which comprises a passage for the gas, filamentous mats of material disposed in said passage, baffling means associated with said mats whereby onwardly moving gases are caused to impinge against surfaces of said filamentous mats, and means associated with said filamentous mats adapted to conduct liquid from the mats, out of contact with gas passing therearound.

WILLIAM A. MYERS.